(12) United States Patent
Ohara

(10) Patent No.: US 6,477,567 B1
(45) Date of Patent: Nov. 5, 2002

(54) METHOD FOR MANAGING A STATUS REQUEST TRANSMITTED FROM A MANAGING DEVICE TO AN INTERFACE DEVICE THROUGH A NETWORK

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/129,537

(22) Filed: Aug. 5, 1998

(30) Foreign Application Priority Data

Aug. 7, 1997 (JP) .............................................. 9-213724

(51) Int. Cl.[7] .......................................... G06F 15/173
(52) U.S. Cl. ...................................... 709/223; 709/250
(58) Field of Search ................................ 709/208, 224, 709/250, 203, 223

(56) References Cited

U.S. PATENT DOCUMENTS

| | | | | |
|---|---|---|---|---|
| 5,323,393 A | * | 6/1994 | Barrett et al. ................ 345/435 |
| 5,678,041 A | * | 10/1997 | Baker et al. ..................... 707/9 |
| 5,742,833 A | * | 4/1998 | Dea et al. ..................... 713/323 |
| 5,802,305 A | * | 9/1998 | McKaughan et al. ......... 709/227 |
| 5,828,863 A | * | 10/1998 | Barrett et al. ................. 703/24 |
| 5,852,746 A | * | 12/1998 | Barrett ........................ 710/19 |
| 5,864,852 A | * | 1/1999 | Luotonen ..................... 707/10 |
| 5,987,514 A | * | 11/1999 | Rangarajan .................. 709/224 |
| 6,009,274 A | * | 12/1999 | Fletcher et al. .............. 395/712 |
| 6,018,619 A | * | 1/2000 | Allard et al. ................ 709/224 |
| 6,020,973 A | * | 2/2000 | Levine et al. ................ 358/1.15 |
| 6,170,067 B1 | * | 1/2001 | Liu et al. ........................ 714/48 |
| 6,189,109 B1 | * | 2/2001 | Sheikh et al. ................... 714/1 |
| 6,219,718 B1 | * | 4/2001 | Villalpando ................. 709/317 |

* cited by examiner

Primary Examiner—Glenton B. Burgess
Assistant Examiner—Bradley Edelman
(74) Attorney, Agent, or Firm—Oliff & Berridge, PLC

(57) ABSTRACT

A network system includes: a managing device for managing a terminal device through a network; the terminal device connected to the network through an interface device; and the interface device. The managing device is provided with an information transmitting device for transmitting transmission information to the network. The interface device is provided with: a judging device for judging whether the received transmission information is to be processed by the interface device or the terminal device; a first information processing device for processing the received transmission information and returning a first process information to the managing device through the network, if the received transmission information is to be processed by the interface device; a transferring device for transferring the received transmission information to the terminal device if the received transmission information is to be processed by the terminal device; and a returning device for returning second process information to the managing device through the network when the second process information is transmitted thereto from the terminal device. The terminal device is provided with a second information processing device for processing the received transmission information and transmitting the second process information to the returning device when receiving the transmission information transferred thereto from the transferring device.

3 Claims, 9 Drawing Sheets

FIG. 5(A)

```
get-request example Message ::=
    {
    version version-1
    community "public",
    data{
        get-request {
            request-id  17,
            error-status noError,
            error-index 0,
            variable-bindings {
                {
                name   1.3.6.1.2.1.1.1.0,
                value  {
                    simple {
                        null
                        }
                    }
                }
            }
        }
    }
```

FIG. 5(B)

```
get-request example Message ::=
    {
    version version-1
    community "public",
    data{
        get-request {
            request-id  17,
            error-status noError,
            error-index 0,
            variable-bindings {
                {
                name   1.3.6.1.2.1.1.1.0,
                value  {
                    simple {
                        string "unix"
                        }
                    }
                }
            }
        }
    }
```

METHOD FOR MANAGING A STATUS REQUEST TRANSMITTED FROM A MANAGING DEVICE TO AN INTERFACE DEVICE THROUGH A NETWORK

BACKGROUND OF THE INVENTION

1. Field of the Invention

The present invention relates to a network system provided with a printer, a computer or the like and a method for managing the network system.

2. Description of the Related Art

There is a network system in which a plurality of printers are managed by a single computer. In this network system, the operational conditions and the failure situations of the respective printers are collectively managed by the single computer, and the repairs thereof are effectively performed. Moreover, when one of the printers cannot be used, the connection thereof is changed so as to substitute another printer for this one of the printers. At this time, the computer for preparing the data of image to be printed and outputted by each printer and the like may be also used to manage the network system. Or, the network system may contain the computer dedicated to prepare the data, apart from the computer for managing the network system.

Now, referring to the single printer contained in the network system, if the printer is connected to a connection line (actually, a telephone line, a so-called LAN (Local Area Network) or the like corresponds to the connection line. Hereafter, this connection line is referred to as a network) for the connections in the network system, the printer is typically connected to the network through an interface card normally referred to as an NIC (Network Interface Card). Each printer comprises one NIC, and further each NIC comprises a CPU, such as a micro computer and the like. Then, the NIC transmits various information from the computer for managing the network system to an appropriate printer, and also has a function of transmitting various data from the appropriate printer through the network to the computer for managing the network system.

In the network system, there are two types of information as the information to be managed by the computer for managing the network system. That is, for example, one information is the information with regard to the setting of the NIC itself, such as an address (an identification number) on the network of the NIC itself, and the other information is the information with regard to the setting of the printer itself, such as a number of copies in each printer to which the NIC is connected.

In the above mentioned NIC, the above mentioned two kinds of the information are stored in advance in ROMs (Read Only Memories) which are all contained in the NIC, as the readable information itself, or as the process procedure of detecting the information (for example, error information and the like) changed on the basis of a state of a device or the information which is specified by a user and stored in a memory, such an RAM (Random Access Memory) and the like. Then, the NIC in which the information are stored and the appropriate printer are connected to each other by using an interface peculiar to the printer.

However, there are many kinds of printers, based on the differences of printing mechanisms and paper feeding mechanisms. Moreover, there is a single printer having various processing mechanisms corresponding to kinds of data to be processed. For example, there are a printer having an electrophotographic process as the printing mechanism, a printer having an ink jet type, a printer having a process suited for a color print, a printer having different devices to supply a print medium based on a paper size and the number of trays for supplying print papers, a printer which can further control a discharge tray, a printer having various processing mechanisms corresponding to kinds of data to be treated (a printer description language, a format of image data and the like), a printer having different resolutions and the like. Furthermore, there is a printer which can add a function in future as an option. In order to effectively utilize the above mentioned various functions, there are a variety of set items in the printer. Accordingly, the statuses of the apparatuses, for example, the error statuses are also different.

Thus, according to the configuration of the conventional NIC, it is necessary to connect to one printer the NIC having the storage content of the ROM peculiar to the printer. Hence, it is necessary to prepare the NIC having the storage contents of the ROMs which are different from each other by the number of the kinds of the printers contained in the network system. Accordingly, this leads to an expensive cost in the configuration of the network system and further this results in a problem that the configuration becomes complex as the whole system.

These problems are not limited to the above mentioned printers. That is, they exist as the similar problems in an image reading apparatus such as an image scanner, a multiple function apparatus having both the printing mechanism and the image reading mechanism (an apparatus having the functions of the printer, the image scanner, a copier, a facsimile and the like), and other terminal devices connected to the network.

SUMMARY OF THE INVENTION

The present invention is proposed in view of the above mentioned problems. It is therefore an object of the present invention to provide a network system, a network managing method, an interface device and a terminal device, which can implement a simple configuration and attain a low cost in a network system including a plurality of printers, a plurality of computers or the like, and a program storage device which stores a computer program to drive the interface device.

The above object of the present invention can be achieved by a network system including: a managing device such as a manager etc., for managing a terminal device through a network; the terminal device such as a printer etc., connected to the network through an interface device; and the interface device such as a NIC etc., which is connected to the terminal device and is also connected to the managing device through the network, wherein (i) the managing device is provided with an information transmitting device such as a CPU etc., for transmitting transmission information to the network, (ii) the interface device is provided with: a judging device such as a CPU etc., for, when receiving the transmission information through the network, judging whether the received transmission information is one transmission information to be processed by the interface device or another transmission information to be processed by the terminal device, based on the received transmission information; a first information processing device such as a CPU etc., for processing the received transmission information and returning a first process information, which is a process result corresponding to the received transmission information, to the managing device through the network, if the received transmission information is one transmission information to be processed by the interface device according to a judgment result of the judging device; a transferring device such as a CPU etc., for transferring the received transmission information to the terminal device if the received transmission information is another transmission information to be processed by the terminal device according to the judgment result; and a returning device such as a transceiver etc., for returning second process information, which is a process result corresponding to the received transmission information transferred to the terminal device from the transferring device, to the managing device through the network when the second process information is transmitted thereto from the terminal device, and (iii) the terminal device is provided with a second information processing device such as a CPU etc., for processing the received transmission information and transmitting the second process information to the returning device when receiving the transmission information transferred thereto from the transferring device.

According to the network system of the present invention, the transmission information is transmitted to the network from the information transmitting device in the managing device. Then, in the interface device, when receiving the transmission information through the network, it is judged by the judging device whether the received transmission information is one transmission information to be processed by the interface device or another transmission information to be processed by the terminal device, based on the received transmission information. Then, if the received transmission information is one transmission information to be processed by the interface device, the received transmission information is processed by the first information processing device, and the first process information is returned to the managing device through the network. Alternatively, if the received transmission information is another transmission information to be processed by the terminal device, the received transmission information is transferred to the terminal device by the transferring device. Then, in the terminal device, when receiving the transmission information transferred from the transferring device, the received transmission information is processed by the second information processing device, and the second process information is transmitted to the returning device in the interface device. Then, in the interface device, when the second process information is transmitted thereto from the terminal device, the second process information is returned by the returning device to the managing device through the network.

Accordingly, since the transmission information to be processed by the interface device is certainly processed by the interface device while the transmission information to be processed by the terminal device is transmitted through the interface device to the terminal device and is then certainly processed by the terminal device, it is not necessary for the interface device to perform a process for the transmission information to be processed by the terminal device. Thus, it is possible to construct the network by connecting the interface device commonly with respective one of various kinds of terminal devices. Therefore, it is not necessary to employ various kinds of interface devices in correspondence with the various kinds of terminal devices, so that it is possible to construct the whole network system in a simplified manner with low cost.

In one aspect of the network system of the present invention, the transmission information includes identification information which corresponds to the transmission information and also indicates a hierarchy structure of a process target included in one of the interface device and the terminal device, and the judging device judges, on the basis of the identification information, whether the transmission information transmitted from the managing device is one transmission information indicative of the process target included in the terminal device or another transmission information indicative of the process target included in the interface device.

According to this aspect, on the basis of the identification information indicating the hierarchy structure, it is judged by the judging device whether the transmission information transmitted from the managing device is one transmission information indicative of the process target included in the terminal device or another transmission information indicative of the process target included in the interface device. Thus, it is possible to certainly judge the attribute of the transmission information by the judging device, so that the subsequent processes can be appropriately performed in the network system.

In this aspect of performing the judgment on the basis of the identification information, the managing device may manage the terminal device on the basis of SNMP (Simple Network Management Protocol), and the identification information may comprise route information in MIB (Management Information Base) information corresponding to the SNMP. In this case, since the managing device manages the terminal device on the basis of the SNMP while the judgment can be performed on the basis of the route information in the MIB information corresponding to the SNMP, the network system can be efficiently managed.

Alternatively, in this aspect of performing the judgment on the basis of the identification information, the managing device may manage the terminal device on the basis of HTTP (Hyper Text Transfer Protocol), and the identification information may comprise URL (Uniform Resource Locator) information in the HTTP. In this case, since the managing device manages the terminal device on the basis of the HTTP while the judgment can be performed on the basis of the URL information in the HTTP, it is possible to construct the widely ranged network by use of the WWW (World Wide Web) in a rather simplified manner with low cost.

In the aspect of performing the judgment on the basis of the identification information, the judging device may use sub-identification information, which is transmitted in advance thereto from the terminal device and indicates the process target included in the terminal device, to thereby judge whether the transmission information transmitted from the managing device is one transmission information indicative of the process target included in the terminal device or another transmission information indicative of the process target included in the interface device. In this case, by use of the sub-identification information, which is transmitted in advance to the interface device from the terminal device, the judgment of the judging device is performed. Thus, since the attribute of the transmission information is judged on the basis of the sub-identification information, it is possible to certainly differentiate the transmission information, so that it is possible for the managing device to easily manage the peculiar operational condition of the terminal device corresponding to the process target in the terminal device itself.

In this aspect of using the sub-identification information, the managing device may manage the terminal device on the basis of SNMP (Simple Network Management Protocol), and the sub-identification information may comprise specification information of specifying a node in MIB (Management Information Base) information corresponding to the SNMP indicating the process target included in the terminal device. In this case, since the managing device manages the terminal device on the basis of the SNMP while the judgment can be performed on the basis of the specification information of specifying the node in the MIB information corresponding to the SNMP, the network system can be efficiently managed.

Alternatively, in this aspect of using the sub-identification information, the managing device may manage the terminal device on the basis of HTTP (Hyper Text Transfer Protocol), and the sub-identification information may comprise URL (Uniform Resource Locator) information in the HTTP indicating the process target included in the terminal device. In this case, since the managing device manages the terminal device on the basis of the HTTP while the judgment can be performed on the basis of the URL information in the HTTP, it is possible to construct the widely ranged network by use of the WWW (World Wide Web) in a rather simplified manner with low cost.

The above object of the present invention can be also achieved by a method of managing the above described network system of the present invention. The method has:(i) in the managing device, an information transmitting process of transmitting transmission information to the network, (ii) in the interface device, a judging process of, when receiving the transmission information through the network, judging whether the received transmission information is one transmission information to be processed by the interface device or another transmission information to be processed by the terminal device, based on the received transmission information; in the interface device, a first information processing of processing the received transmission information and returning a first process information, which is a process result corresponding to the received transmission information, to the managing device through the network, if the received transmission information is one transmission information to be processed by the interface device according to a judgment result of the judging process; and in the interface device, a transferring process of transferring the received transmission information to the terminal device if the received transmission information is another transmission information to be processed by the terminal device according to the judgment result, (iii) in the terminal device, a second information processing process of processing the received transmission information and transmitting second process information, which is a process result corresponding to the received transmission information transferred to the terminal device from the interface device, to the interface device when receiving the transmission information transferred by the transferring process, and (iv) in the interface device, a returning process of returning the second process information to the managing device through the network when the second process information is transmitted thereto from the terminal device.

According to the network managing method of the present invention, in the same manner as the above described network system of the present invention, since the transmission information to be processed by the interface device is certainly processed by the interface device while the transmission information to be processed by the terminal device is transmitted through the interface device to the terminal device and is then certainly processed by the terminal device, it is not necessary for the interface device to perform a process for the transmission information to be processed by the terminal device. Thus, it is possible to construct the network by connecting the interface device commonly with respective one of various kinds of terminal devices, so that it is possible to construct the whole network system in a simplified manner with low cost.

In the same manner as the above described network system of the present invention, there are various aspects of the network managing method of the present invention, as described below.

Namely, in one aspect of the network managing method of the present invention, the transmission information includes identification information which corresponds to the transmission information and also indicates a hierarchy structure of a process target included in one of the interface device and the terminal device, and the judging process judges, on the basis of the identification information, whether the transmission information transmitted from the managing device is one transmission information indicative of the process target included in the terminal device or another transmission information indicative of the process target included in the interface device. Accordingly, it is possible to certainly judge the attribute of the transmission information by the judging process, so that the subsequent processes can be appropriately performed in the network system.

In this aspect of performing the judgment on the basis of the identification information, the managing device may manage the terminal device on the basis of SNMP (Simple Network Management Protocol), and the identification information may comprise route information in MIB (Management Information Base) information corresponding to the SNMP. Accordingly, the network system can be efficiently managed.

Alternatively, in this aspect of performing the judgment on the basis of the identification information, the managing device may manage the terminal device on the basis of HTTP (Hyper Text Transfer Protocol), and the identification information may comprise URL (Uniform Resource Locator) information in the HTTP. Accordingly, it is possible to construct the widely ranged network by use of the WWW (World Wide Web) in a rather simplified manner with low cost.

In the aspect of performing the judgment on the basis of the identification information, the judging process may use sub-identification information, which is transmitted in advance from the terminal device to the interface device and indicates the process target included in the terminal device, to thereby judge whether the transmission information transmitted from the managing device is one transmission information indicative of the process target included in the terminal device or another transmission information indicative of the process target included in the interface device. Accordingly, it is possible for the managing device to easily manage the peculiar operational condition of the terminal device corresponding to the process target in the terminal device itself.

In this aspect of using the sub-identification information, the managing device may manage the terminal device on the basis of SNMP (Simple Network Management Protocol), and the sub-identification information may comprise specification information of specifying a node in MIB (Management Information Base) information corresponding to the SNMP indicating the process target included in the terminal device. Accordingly, the network system can be efficiently managed.

Alternatively, in this aspect of using the sub-identification information, the managing device may manage the terminal device on the basis of HTTP (Hyper Text Transfer Protocol), and the sub-identification information may comprise URL (Uniform Resource Locator) information in the HTTP indicating the process target included in the terminal device. Accordingly, it is possible to construct the widely ranged network by use of the WWW (World Wide Web) in a rather simplified manner with low cost.

The above object of the present invention can be also achieved by an interface device in a network system, the network system including: a managing device for managing a terminal device through a network; the terminal device connected to the network through the interface device; and the interface device which is connected to the terminal device and is also connected to the managing device through the network. The interface device is provided with: a judging device for, when receiving the transmission information through the network from the managing device, judging whether the received transmission information is one transmission information to be processed by the interface device or another transmission information to be processed by the terminal device, based on the received transmission information; a first information processing device for processing the received transmission information and returning a first process information, which is a process result corresponding to the received transmission information, to the managing device through the network, if the received transmission information is one transmission information to be processed by the interface device according to a judgment result of the judging device; a transferring device for transferring the received transmission information to the terminal device if the received transmission information is another transmission information to be processed by the terminal device according to the judgment result; and a returning device for returning second process information, which is a process result corresponding to the received transmission information transferred to the terminal device from the transferring device, to the managing device through the network when the second process information is transmitted thereto from the terminal device.

According to the interface device of the present invention, in the same manner as the above described network system of the present invention, since the transmission information to be processed by the interface device is certainly processed by the interface device while the transmission information to be processed by the terminal device is transmitted through the interface device to the terminal device and is then certainly processed by the terminal device, it is not necessary for the interface device to perform a process for the transmission information to be processed by the terminal device. Thus, it is possible to construct the network by connecting the interface device commonly with respective one of various kinds of terminal devices, so that it is possible to construct the whole network system in a simplified manner with low cost.

The above object of the present invention can be also achieved by a program storage device readable by an interface device having a computer, tangibly embodying a program of instructions executable by the computer to perform method processes for performing an interface operation of the interface device in the above described network system of the present invention. The method processes have: a judging process of, when receiving the transmission information through the network from the managing device, judging whether the received transmission information is one transmission information to be processed by the interface device or another transmission information to be processed by the terminal device, based on the received transmission information; a first information processing process of processing the received transmission information and returning a first process information, which is a process result corresponding to the received transmission information, to the managing device through the network, if the received transmission information is one transmission information to be processed by the interface device according to a judgment result of the judging process; a transferring process of transferring the received transmission information to the terminal device if the received transmission information is another transmission information to be processed by the terminal device according to the judgment result; and a returning process of returning second process information, which is a process result corresponding to the received transmission information transferred to the terminal device by the transferring process, to the managing device through the network when the second process information is transmitted thereto from the terminal device.

According to the program storage device, such as a ROM, a CD-ROM, a DVD-ROM, a floppy disk or the like, of the present invention, the above described network managing method of the present invention can be performed or the above described interface device of the present invention can be realized as the interface device reads and executes the program of instructions.

The above object of the present invention can be also achieved by a terminal device in a network system, the network system including: a managing device such as a manager etc., for managing the terminal device through a network; and the terminal device such as a printer etc., connected to the network. The terminal device is provided with (i) a processing unit such as a CPU etc., for performing a predetermined process in the terminal device, and (ii) an interface unit such as a NIC etc., for connecting the processing unit with the network. The interface unit is provided with: a judging device for, when receiving the transmission information through the network from the managing device, judging whether the received transmission information is one transmission information to be processed by the interface unit or another transmission information to be processed by the processing unit, based on the received transmission information; a first information processing device for processing the received transmission information and returning a first process information, which is a process result corresponding to the received transmission information, to the managing device through the network, if the received transmission information is one transmission information to be processed by the interface unit according to a judgment result of the judging device; a transferring device for transferring the received transmission information to the processing unit if the received transmission information is another transmission information to be processed by the processing unit according to the judgment result; and a returning device for returning second process information, which is a process result corresponding to the received transmission information transferred to the processing unit from the transferring device, to the managing device through the network when the second process information is transmitted thereto from the processing unit. The processing unit is provided with a second information processing device for processing the received transmission information and transmitting the second process information to the returning device when receiving the transmission information transferred from the transferring device.

According to the terminal device of the present invention, in the same manner as the above described network system of the present invention, since the transmission information to be processed by the interface unit is certainly processed by the interface unit while the transmission information to be processed by the processing unit is transmitted through the interface unit to the processing unit and is then certainly processed by the processing unit, it is not necessary for the interface unit to perform a process for the transmission information to be processed by the processing unit. Thus, it is possible to construct the network by connecting the interface unit commonly with respective one of various kinds of processing units, so that it is possible to construct the whole network system in a simplified manner with low cost.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5A is a diagram showing an example of a request in the first embodiment;

FIG. 5B is a diagram showing an example of a response in the first embodiment;

DETAILED DESCRIPTION OF THE PREFERRED EMBODIMENTS

Preferred embodiments of the present invention are explained below with reference to the drawings. Incidentally, each embodiment explained below is an embodiment in which the present invention is applied to a network system which comprises a plurality of printers as terminal devices and further comprises a plurality of computers to perform the printing processes by using the respective printers and which unitarily manages the set conditions of the respective printers and the like.

(I) First Embodiment

At first, a first embodiment in which the present invention is applied to a network system managed in accordance with SNMP is explained with reference to FIG. 1 to FIG. 5.

Now, the SNMP is schematically explained. The SNMP is also referred to as a "simple network management protocol" and is a protocol (a rule or standard) when network management information of a network apparatus (which is also referred to as an "agent") such as a printer in this embodiment is transmitted to a management computer (also referred to as a "manager") for managing the network system. A structure of the network management information and the database thereof are defined apart from this protocol. This information is referred to as an MIB (Management Information Base) information. This MIB information is concretely described later.

A configuration of the network system in the first embodiment is explained below with reference to FIG.1.

Figure 1:
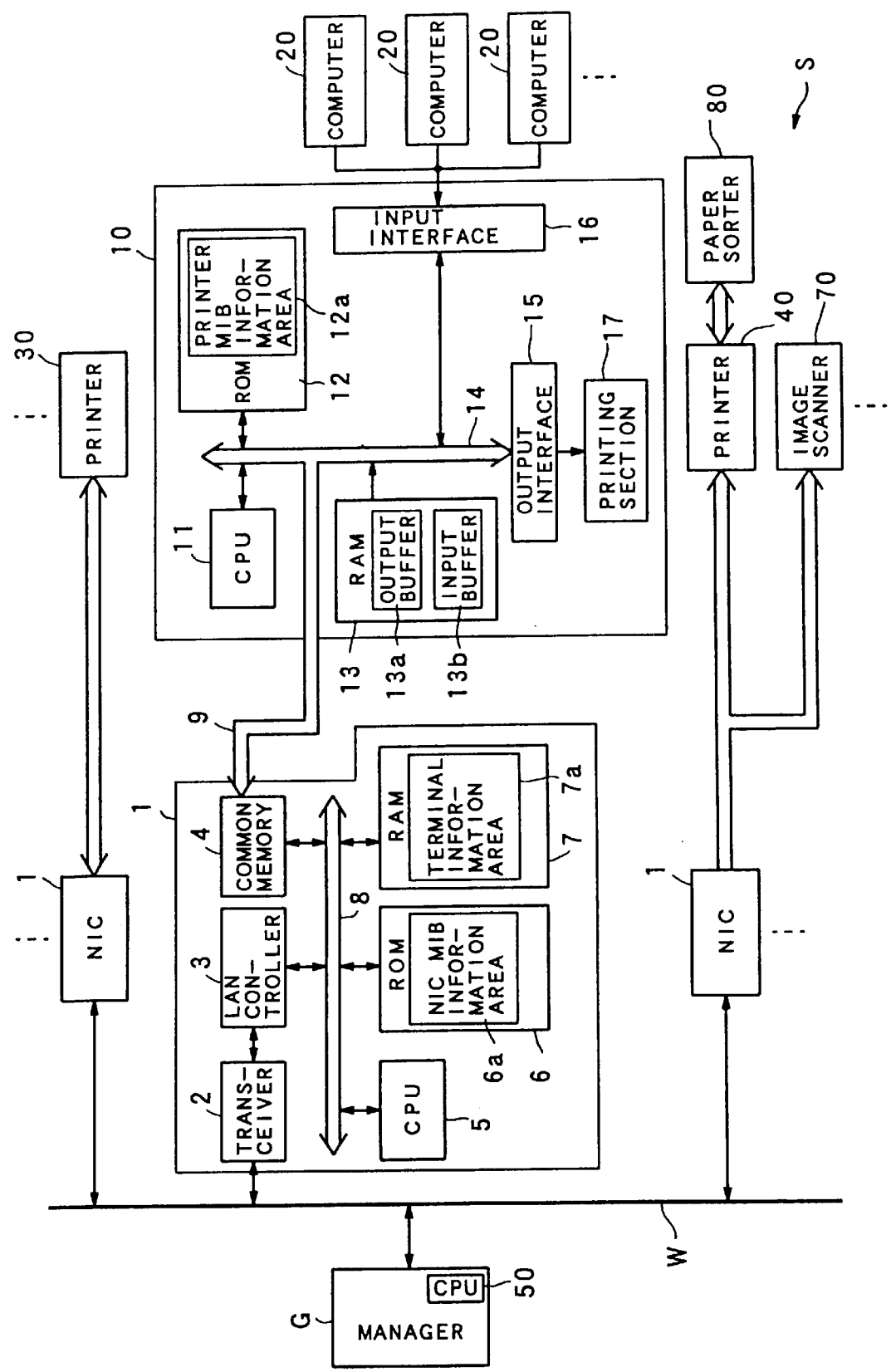
FIG. 1 is a block diagram showing a schematic configuration of a network system in a first embodiment.

As shown in FIG. 1, a network system S in the first embodiment is provided with: a manager (management computer) G servicing as a managing device; a network W such as a telephone line, an LAN and the like; a plurality of NICs 1 servicing interface devices; printers 10, 30 and 40 servicing as terminal devices; a plurality of computers 20 connected to the printer 10; an image scanner 70 connected in parallel with the printer 40; and a paper sorter 80 connected in series with the printer 40. The printers 10, 30 and 40 are different in kind from each other.

On one hand, the manager G includes a CPU 50 servicing as an information transmitter.

The NIC 1 includes: a transceiver 2 servicing as a returning device; an LAN controller 3; a common memory 4; a CPU 5 servicing as a judging device, a first information processor and a transferring device; an ROM 6; an RAM 7; and a bus 8. The ROM 6 has therein an NIC MIB information area 6a. Moreover, the RAM 7 has therein a terminal information area 7a.

On the other hand, the printer 10 is provided with: a CPU 11 servicing as a second information processor; an ROM 12; an RAM 13; a bus 14; an output interface 15; an input interface 16; and a printing section 17. The ROM 12 has therein a printer MIB information area 12a. The RAM 13 has therein an output buffer 13a and an input buffer 13b. The data indicative of a scheme of an MIB tree to be processed by the NIC 1 or the printer 10 and a processing procedure to obtain the management information of respective objects (detailed later) of the MIB information are stored in the NIC MIB information area 6a and the printer MIB information area 12a, as respectively described later. Incidentally, the particular information (the lead information) to specify a node on the MIB tree scheme targeted by the process in the printer 10 is further stored in the printer MIB information area 12a.

Moreover, the printer 10 is connected to the NIC 1 through a connection line 9 connected to the bus 14, and also connected to the respective computers 20 through the input interface 16.

Next, a schematic operation in the network system S is explained below with reference to FIG.1. Although the processes in the NIC 1 and the printer 10 are explained below, the similar processes are performed between the other NICs 1 and the printer 30.

The CPU 50 in the manager G generates request information to request of the printer 10 the information necessary for the management of the printer 10 connected to the NIC 1 (hereafter, which is simply referred to as a "request"), and then transmits it to the transceiver 2 of the NIC 1 through the network W. At this time, node information to indicate whether information desired by the manager G is information to be obtained by the process in the NIC 1 or information to be obtained by the process in the printer 10 is added to the request. This node information on the MIB information is detailed later.

The transceiver 2 which has received the request demodulates it, and then outputs it to the bus 8 through the LAN controller 3. The LAN controller 3 controls the information to be transmitted to or received from the manager G through the network W.

Next, if the request received by the NIC 1 is the information to be processed by the NIC 1, the CPU 5 processes the request by using the information stored in the NIC MIB information area 6a in the ROM 6. At this time, the information necessary for the process in the CPU 5 is stored in the RAM 7 tentatively and readably.

After that, the CPU 5 returns the processed result (hereafter, the processed result to be returned to the manager G is referred to as a "response") to the manager G through the bus 8, the LAN controller 3, the transceiver 2 and the network W.

On the other hand, if the request received by the NIC 1 is the information to be processed by the printer 10, the CPU 5 transfers the request to the printer 10 through the common memory 4 and the connection line 9. At this time, after the request is written to the common memory 4, the CPU 5 causes the CPU 11 to generate an interrupt (i.e., an interrupt command) through a signal line (not shown) and then execute the process of the request.

Incidentally, a control program necessary for the process in the CPU 5 in response to the request is stored in advance in the ROM 6.

The common memory 4 is a memory to transiently store the information to be shared between the NIC 1 and the printer 10 when the information is processed.

Next, when the request, which is transferred by the NIC 1 and is to be processed by the printer 10, is inputted to the printer 10 through the connection line 9, the CPU 11 obtains the request through the bus 14, and then processes the request by using the information stored in the printer MIB information area 12a in the ROM 12. After that, the CPU 11 returns the response, which is the processed result, to the manager G through the bus 14, the connection line 9, the common memory 4, the NIC 1 and the network W. At this time, the information necessary for the process in the CPU 11 is stored in the RAM 13 transiently and readably. A control program necessary for the process in the CPU 11 to the request is stored in advance in the ROM 12.

Moreover, the NIC 1, which has received from the printer 10 the response to the request to be processed by the printer 10, transfers the response to the manager G through the network W while maintaining the response in the current state.

On one hand, the data of the image, which is outputted by each computer 20 and is to be printed-outputted by the printer 10, is inputted to the printer 10 through the input interface 16, stored through the bus 14 in the input buffer 13, develop-processed into the print data and transiently stored in the output buffer 13a. After that, it is outputted again through the bus 14 from the output interface 15 to the printing section 17. Then, the print-output corresponding to the data is executed. On the other hand, when the data of the image, which is outputted by the other computer (not shown) and is to be printed-outputted, is outputted by the printer 10, the data is inputted to the input buffer 13b of the printer 10 through the NIC 1 via the network W, and is then outputted similarly to the above mentioned case. This original print-output process in the printer 10 is executed under the control of the CPU 11 based on the control program stored in the ROM 12.

Incidentally, the respective printers 10, 30 and 40 contained in the network W have the common NICs 1. However, the respective printers 10, 30 and 40 are different from each other in the kind of the printer itself. Actually, the printer MIB information stored in the printer MIB information area in each printer is different for each printer, on the basis of the differences of the printing mechanisms and the data used therein.

Next, the MIB information in this embodiment is explained with reference to FIG. 2.

As mentioned above, the structure of the network management information in the network W and the database thereof are described in the MIB information in this embodiment. More actually, the MIB information is constituted in a hierarchical tree structure as shown in FIG. 2.

Each branch in the tree structure is referred to as a node. As shown in FIG. 2, a number (i.e., a number written in parentheses in FIG. 2) given to each node is referred to as a node information (or an identification number).

An item which is located at an end (which is also referred to as a leaf) in each node and targeted by the management of the manager G is typically referred to as an object. On the other hand, nodes which are not located at the end are referred to as an object group in a sense of the objects located at a low order.

Figure 2:
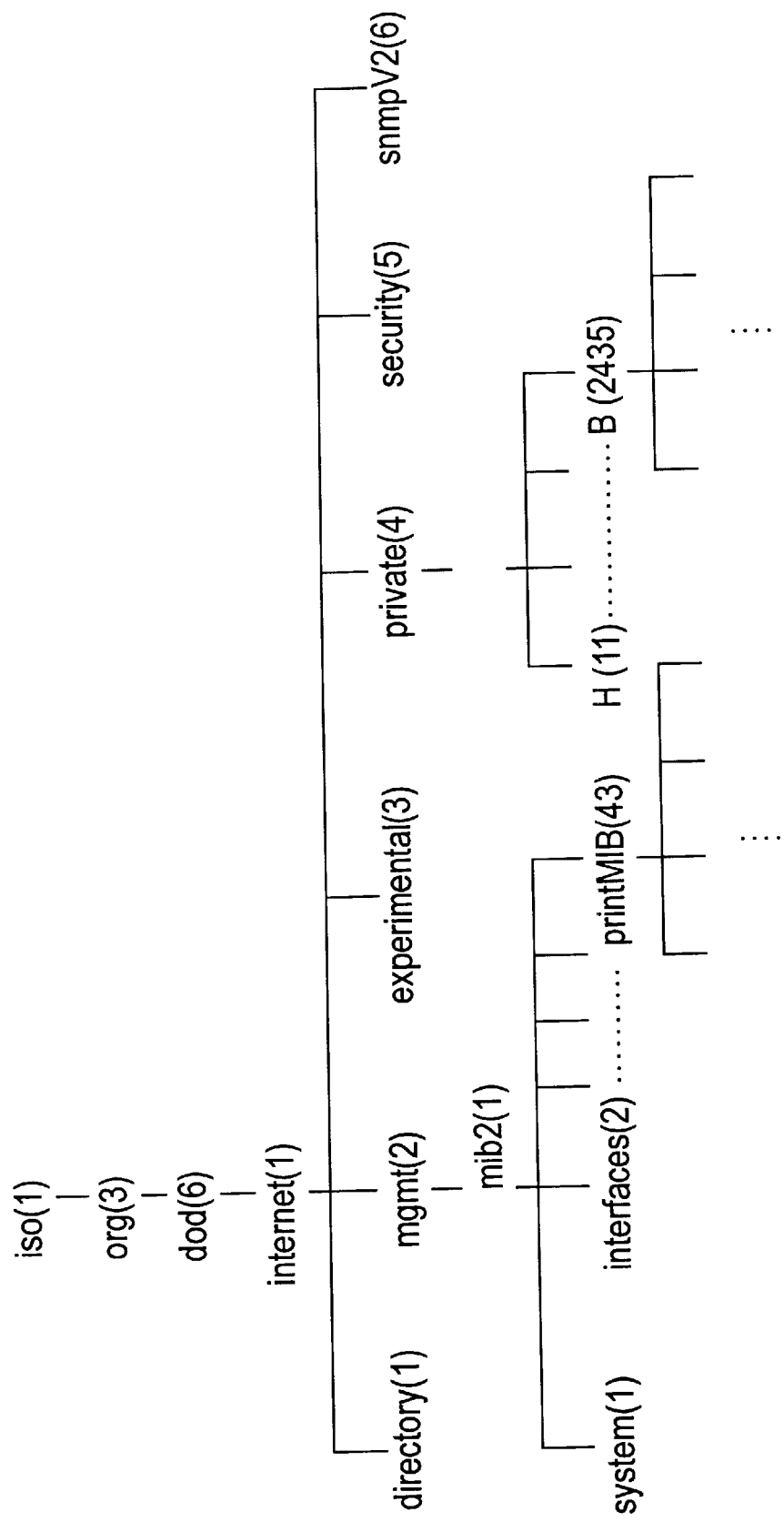
FIG. 2 is a diagram showing a scheme of an MIB tree.

FIG. 2 shows a scheme of the MIB tree to manage the network W as a whole. In the scheme, the information in the hierarchies equal to or lower than "print MIB(43)" and the information in the hierarchies equal to or lower than "B(2435)" are stored in the printer MIB information area 12a of the ROM 12 in each printer, as the printer MIB information peculiar to each printer. More actually, for example, various conditions (objects) to be managed by the printer itself, such as a setting of copy sheets in the printer, a setting of a paper feeding tray or a setting of a resolution are indicated at the ends of the low order nodes in "print MIB(43)", which are different from each other on the basis of the differences of the types of the printers. The other NIB information shown in FIG. 2 are the MIB information for the respective NICs. They are stored in the NIC MIB information area 6a in the ROM 6 of the NIC 1 as the NIC MIB information.

When the request is generated by specifying the MIB information in each hierarchy by the manager G, the node information assigned to the MIB information in each hierarchy is described and specified as one method of specifying it. That is, for example, when the object group of "print MIB(43)" in FIG. 2 is specified, the node information included in the request from the manager G is described as "1, 3, 6, 1, 2, 1, 43" as a column of the node information on the route of the MIB information to "print MIB(42)". This route information indicative of the route on the MIB information is typically referred to as an object identifier.

Now, information described in the respective nodes shown in FIG. 2 are schematically explained. The information "iso(1)" indicates an object group managed by the ISO (International Organization of Standardization) and the IEC (International Electrotechnical Commission). The information "org(3)" indicates an object group managed by an agency entrusted by the ISO/IEC. The information "dod(6)" indicates an object group managed by the National Military Establishment. The information "internet(1)" indicates an object group in relation to an Internet. The information "directory(1)" indicates an object group reserved for a future utilization. The information "mgmt(2)" indicates an object group in relation to a management. The information "experimental(3)" indicates an object group for an experiment. The information private(4) indicates an object group for a private utilization. The information "security(5)" indicates an object group in relation to a secret security in a network system. The information "snmpV2(6)" indicates an object group in relation to a version 2 of the SNMP. The information "mib2(1)" indicates an object group in relation to the MIB 2. The information "enterprises(1)" indicates an object group peculiar to a predetermined company. The information "system(1)" indicates an object group of configuration information of a targeted particular device. The information "interfaces(2)" indicates an object group in relation to a connection between network systems. The information "print MIB(43)" indicates an object group in relation to only a printer. The information "H(11)" indicates an object group in relation to a printer of H Corporation (H Company). The information "B(2435)" indicates an object group in relation to a printer of B Corporation (B company).

A request as the transmission information and a response as the response information corresponding thereto have configurations illustrated in FIGS. 5A and 5B, respectively. Incidentally, they are illustrated in visible forms in FIGS. 5A and 5B. However, in the actual information transmitted or received on the network system, the items shown in FIGS. 5A and 5B are not transmitted or received as an ASCII (American Standard Code for Information Interchange) code. Instead, they are encoded as forms that can be recognized by the CPU. The items indicated by "name 1.3.6.1.2.1.1.1.1.0" in the illustrations shown in FIGS. 5A and 5B are the above mentioned object identifiers. The items indicated by "value{}" are objects and the information indicating the statuses thereof. Moreover, the information representing this status is information "null" in the request illustrated in FIG. 5A. The information "string"unix"" is prepared and responded at the appropriate position in the response corresponding to the information "null" (refer to FIG. 5B).

Figure 3:
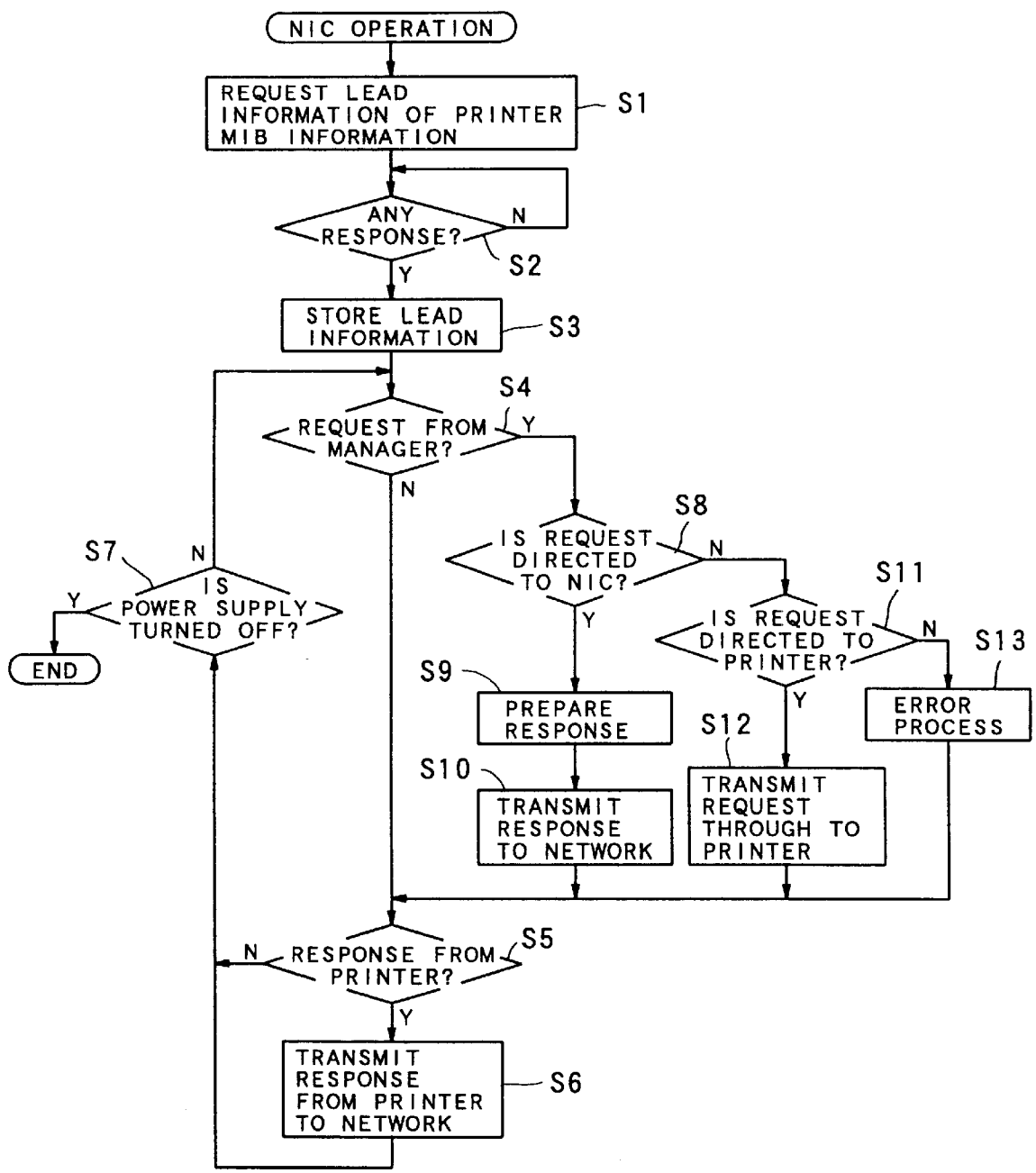
FIG. 3 is a flowchart showing operations of an NIC in the first embodiment.
Figure 4:
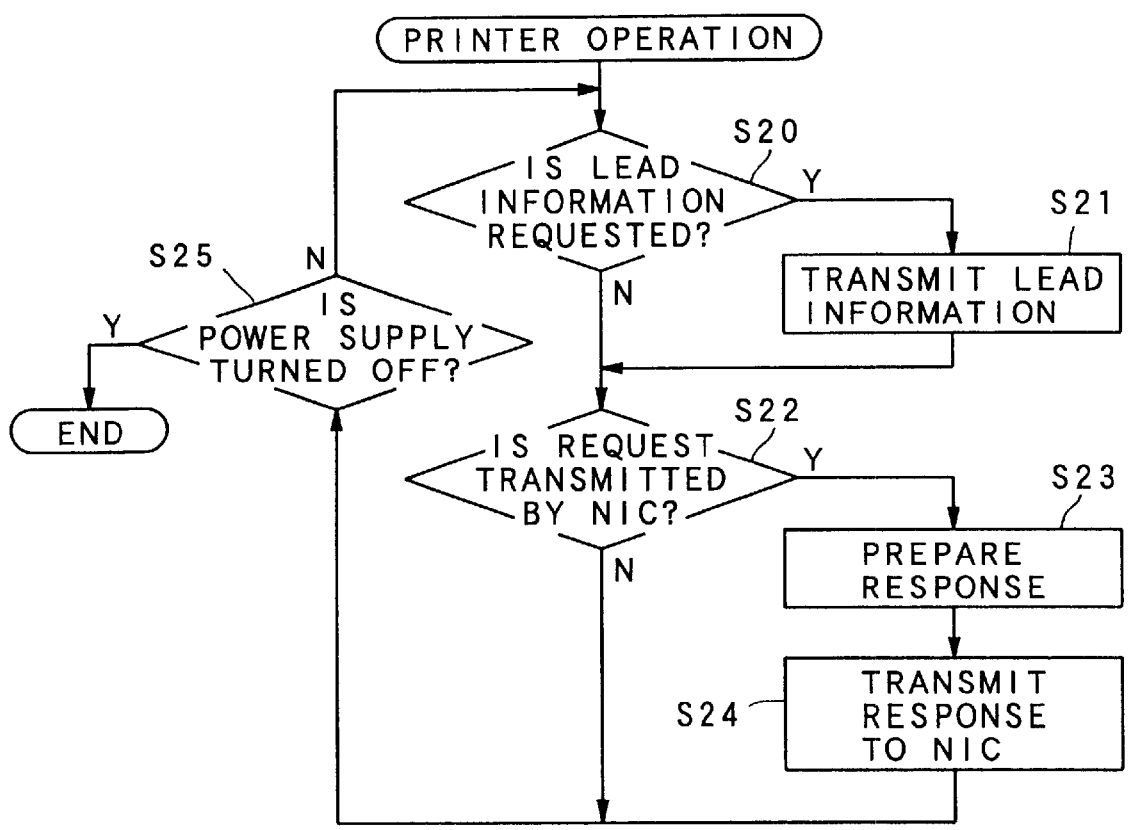
FIG. 4 is a flowchart showing operations of a printer in the first embodiment.

Next, the processes of the request in which the MIB information according to the present invention is used are actually explained with reference to FIGS. 3 and 4 with the process between the NIC 1 and the printer 10 as a target. Incidentally, a program corresponding to a flowchart shown in FIG. 3 is stored in advance in the ROM 6 and is read out to the CPU 5 to be executed as the occasion demands. Moreover, a program corresponding to a flowchart shown in FIG. 4 is stored in advance in the ROM 12 and is read out to the CPU 11 to be executed as the occasion demands.

At first, the process in the NIC 1 is explained with reference to the flowchart shown in FIG. 3.

As shown in FIG.3, in the NIC 1, at first, the request signal of requesting to transmit to the NIC 1 the lead information of specifying a lead node in the scheme of the MIB tree to be processed in accordance with the procedure stored in the printer MIB information area 12a in the printer 10 is transmitted to the printer 10 through the connection line 9 (Step S1). In the example shown in FIG. 2, this lead information is information of specifying "43" and "2435" and also becomes the route information up to this node. The lead information can be given as the above mentioned object identifier or can be given as the node information (identification number) of a particular object group under the management of the NIC 1.

Then, it is judged whether or not the lead information stored as the printer MIB information in the printer MIB information area 12a is transmitted by the printer 10 in response to the request (Step S2). If the lead information is not transmitted (Step S2; NO), the operational flow waits until the lead information is transmitted. If the lead information is transmitted (Step S2; YES), the transmitted lead information is stored in the terminal information area 7a in the RAM 7 (Step S3).

Then, it is judged whether or not a request to which the node information (object identifier) is added is transmitted by the manager G (Step S4). If the request is not transmitted (Step S4; NO), it is judged whether or not a response is transmitted by the printer 10 (Step S5). At this time point, any response is not transmitted by the printer 10 (Step S5; NO). Thus, it is judged whether or not a power supply of the NIC 1 is turned off (Step S7). If it is judged that the power supply is turned off (Step S7; YES), the process is ended while maintaining its current state. If it is judged that the power supply is not turned off (Step S7 ; NO), the operational flow returns to the step S4, and waits for a reception of a next request.

On the other hand, if it is judged by the judgment at the step S4 that the request is transmitted by the manager G (Step S4; YES), the node information (the object identifier) added to the request is compared with the lead information stored in the terminal information area 7a in the RAM 7 at the step S3. Then, it is judged by the CPU 5 whether or not the request is directed to the NIC 1 i.e., whether or not the request targets the information (the object) to be processed by the NIC 1 (Step S8).

If the request targets the information to be processed by the NIC 1 (Step S8 ; YES), a response corresponding to the request is prepared by the CPU 5 (Step S9). The prepared response is transmitted to the manager G through the bus 8, the LAN controller 3 and the network W (step S10). After that, the operational flow proceeds to the step S5. However, there is no response from the printer 10 in this case (Step S5; NO). Thus, the operational flow proceeds to the step S7 while maintaining its current state. Then, the above mentioned operations are repeated.

If it is judged by the judgment at the step S8 that the transmitted request does not target the information to be processed by the NIC 1 (Step S8; NO), the node information (the object identifier) added to the request is compared with the lead information stored in the terminal information area 7a in the RAM 7, so that it is judged by the CPU 5 whether or not the request is directed to the printer 10 i.e., whether or not the request targets the information (object) to be processed by the printer 10 (Step S11). If the request targets the information to be processed by the printer 10 (Step S11; YES), the request is transmitted to the printer 10 through the common memory 4 and the connection line 9 while maintaining its current state (Step S12). Then, the operational flow proceeds to the step S5, and the operation at the step S7 is executed.

Moreover, if it is judged by the judgment at the step S11 that the request does not target information to be processed by the printer 10 (Step S11; NO), a predetermined error process when the received request cannot be processed is executed (Step S13). Then, the operational flow proceeds to the step S5.

Incidentally, if a response corresponding to the request is transmitted by the printer 10 in response to the process at the step S12 (Step S5; YES), the response is transferred to the manager G through the network W (Step S6). Then, the operational flow proceeds to the step S7.

Next, the operation of the printer 10 corresponding to that of the NIC 1 shown in FIG. 3 is explained with reference to FIG. 4.

In the printer 10, at first, it is judged whether or not the request signal of transmitting the lead information in the scheme of the MIB tree to be processed in accordance with the procedure stored in the printer MIB information area 12a is transmitted by the NIC 1, in correspondence with the step S1 in FIG. 3 (Step S20). If the request signal is transmitted (Step S20; YES), the lead information is transmitted to the NIC 1 (Step S21). Then, the operational flow proceeds to a step S22.

If it is judged by the judgment at the step S20 that the request signal is not transmitted by the NIC 1 (Step S20; NO), the operation flow directly proceeds to the step S22. Then, it is judged whether or not the request targeting the information to be processed by the printer 10 is transmitted through the NIC 1, in correspondence with the step S12 in FIG. 3 (Step S22). If the request is not transmitted (Step S22; NO), it is judged whether or not the power supply of the printer 10 is turned off (Step S25). If it is judged that the power supply is turned off (Step S25; YES), the process at the printer 10 is ended while maintaining its current state. If it is not judged that the power supply is not turned off (Step S25; NO), the operational flow returns to the step S20, and waits for a reception of a next request signal.

On the other hand, if it is judged by the judgment at the step S22 that the request targeting the information to be processed by the printer 10 is transmitted (Step S22; YES), the response corresponding to the request is prepared by the CPU 11 (Step S23). The prepared response is transmitted to the manager G through the NIC 1 and the network W, in correspondence with the steps S5 and S6 in FIG. 3 (Step S24). After that, the operational flow proceeds to the step S25, and the above mentioned processes are executed.

Incidentally, the above mentioned processes between the NIC 1 and the printer 10 are also similarly executed between the NIC 1 and the printer 30. That is, the NIC MIB information corresponding to the request to be processed by the NIC 1 is stored in the ROM 6 of the NIC 1, for example, as for the processes between the NIC 1 and the printer 30. On the other hand, the printer MIB information corresponding to the request (i.e., the request with regard to an object peculiar to the printer 30) to be processed by the printer 30 is stored in the ROM 12 of the printer 30. Accordingly, the request to be processed by the NIC 1 is processed by the NIC 1. Then, the response is returned. On the other hand, the request to be processed by the printer 30 is passed through the NIC 1 and transmitted to and processed by the printer 30. Then, the response is returned.

As mentioned above, the printer 10 is connected to the NIC 1 in a one-to-one relation. In addition, as shown in FIG. 1, the printer 40 is connected to the NIC 1, and further, for example, the image scanner 70 can be connected to the NIC 1 in parallel to the printer 40.

In this case, in the steps S1 to S3 of the explanations about the processes in the NIC 1, the NICl sequentially outputs the request signals to the printer 40 and the image scanner 70, and then obtains the responses of the respective lead information, and further brings the obtained lead information into proper correlation and stores in the terminal information area 7*a* in the RAM 7. If the request is transmitted by the manager G (Step S8), the judgment is performed in accordance with the lead information, which has the proper correlation and is stored in this terminal information area 7*a*, and then the request is transmitted to one of the printer 40 and the image scanner 70. After that, the above mentioned processes respectively corresponding to the printer 40 and the image scanner 70 are executed in the printer 40 and the image scanner 70.

On the other hand, the intelligent paper sorter 80 (which has an exclusive CPU) may be connected to the printer 40, as shown in FIG. 1.

In this case, the printer 40 performs the process similar to that for the NIC 1. That is, the NIC 1 judges the request from the manager G. If judging from the object identifier that the request targets the information to be processed by the printer 40 or a device located at the lower order than the printer 40, the NIC 1 transfers the request to the printer 40. Then, the printer 40 judges this request transferred by the NIC 1. If judging that the request targets the information to be processed by the paper sorter 80 located at the lower order, the printer 40 transfers the request to the paper sorter 80. After that, if the response is returned by the paper sorter 80, the printer 40 transfers it to the NIC 1. Then, the NIC 1 transmits the returned response to the manager G.

As explained above, according to the processes in the network system S of the first embodiment, the request to be processed by the NIC 1 is processed by the NIC 1. On the other hand, the request to be processed by the printer 10 is passed through the NIC 1, is transmitted to the printer 10 and is processed by the printer 10. Thus, the NIC 1 need not process the process with regard to the request to be processed by the printer 10. Hence, it is possible to respectively connect the plurality of kinds of printers to the common NIC 1 to thereby implement the network system S.

The request includes the object identifier, which corresponds to the request and also indicates the hierarchical structure of the object included in any one of the NIC 1 and the printer 10. The CPU 5 judges, on the basis of the object identifier, whether the request transmitted by the manager G is the request indicative of the object included in the printer 10 or the request indicative of the object included in the NIC 1. Thus, it is possible to surely judge and process the attribute of the request.

Moreover, it is possible to manage the printer 10 based on the SNMP and also possible to effectively manage the network system S since the object identifier is the route information in the MIB information corresponding to the SNMP.

Moreover, the lead information is used to judge whether the request transmitted by the manager G is the request indicative of the object included in the printer 10 or the request indicative of the object included in the NIC 1. Thus, it is possible to surely classify the request. Furthermore, the manager G can easily manage the operational condition, which corresponds to the object of the printer 10 itself and is peculiar to the printer 10.

The printer 10 is managed in accordance with the SNMP, and also the lead information is the particular information to specify the node in the MIB information corresponding to the SNMP to be processed by the printer 10. Thus, it is possible to efficiently manage the network system S.

Incidentally, in the above mentioned explanation, the request signal is transmitted by the NIC 1 to thereby obtain the lead information in the scheme in the MIB tree of the processing device, such as the printer 10 or the like. However, in addition, it may be implemented so as to voluntarily transmit the lead information to the NIC 1 from the printer 10 or the like, in the procedure of the initializing process when the power supply of the NIC, the printer 10 or the like is turned on.

(II) Second Embodiment

Next, a second embodiment according to the present invention is explained with reference to FIGS. 6 to 9.

In the above described first embodiment, the case is explained in which the present invention is applied to the network system managed in accordance with the SNMP. However, the second embodiment is an embodiment in which the present invention is applied to a network system managed by using a so-called WWW (a wide area information system which establishes a hyper text on a network to enable accessing of all information).

Now, the WWW is schematically explained. The WWW is an information system to unitarily manage network management information of terminal devices such as printers in this embodiment by means of another computer. This computer has a program referred to as a "WWW browser" (a program to sequentially read a setting state of the terminal device and the like for each terminal device), reads and grasps a state of each terminal device to thereby manage a network. Hereafter, this computer is referred to as a browser computer. Then, in order to represent the state of each terminal device, a software referred to as a "hyper text" is used to represent image and character information indicative of the state. A so-called HTTP is used as a protocol used for a communication between the browser computer and each terminal device. Moreover, for example, a language referred to as an HTML (Hyper Text Markup Language) is used as the language to represent the hyper text.

In this embodiment, each terminal device is provided with a program referred to as a CGI (Common Gateway Interface). The CGI is used to establish, in accordance with a specification from the browser computer, the HTML corresponding to the specification, and further used to interpret the information transmitted from the browser computer to the server. This information is typically referred to as a form. For example, if a user of the browser computer sets a copy sheet of a printer to "5", a form of "COPIES=5" is transmitted from the browser computer to the CGI within a server. The server is provided with the NIC, and is a processor to supply data, control information or the like to the printer and the like connected to the NIC. The CGI for the NIC is contained in the server. At this time, in order to specify the terminal device from the browser computer, each terminal device is identified and specified in accordance with the identification information referred to as a URL. This URL is identification information peculiar to each terminal device. In this embodiment, the NIC and the printer connected thereto have URLs different from each other).

Figure 6:
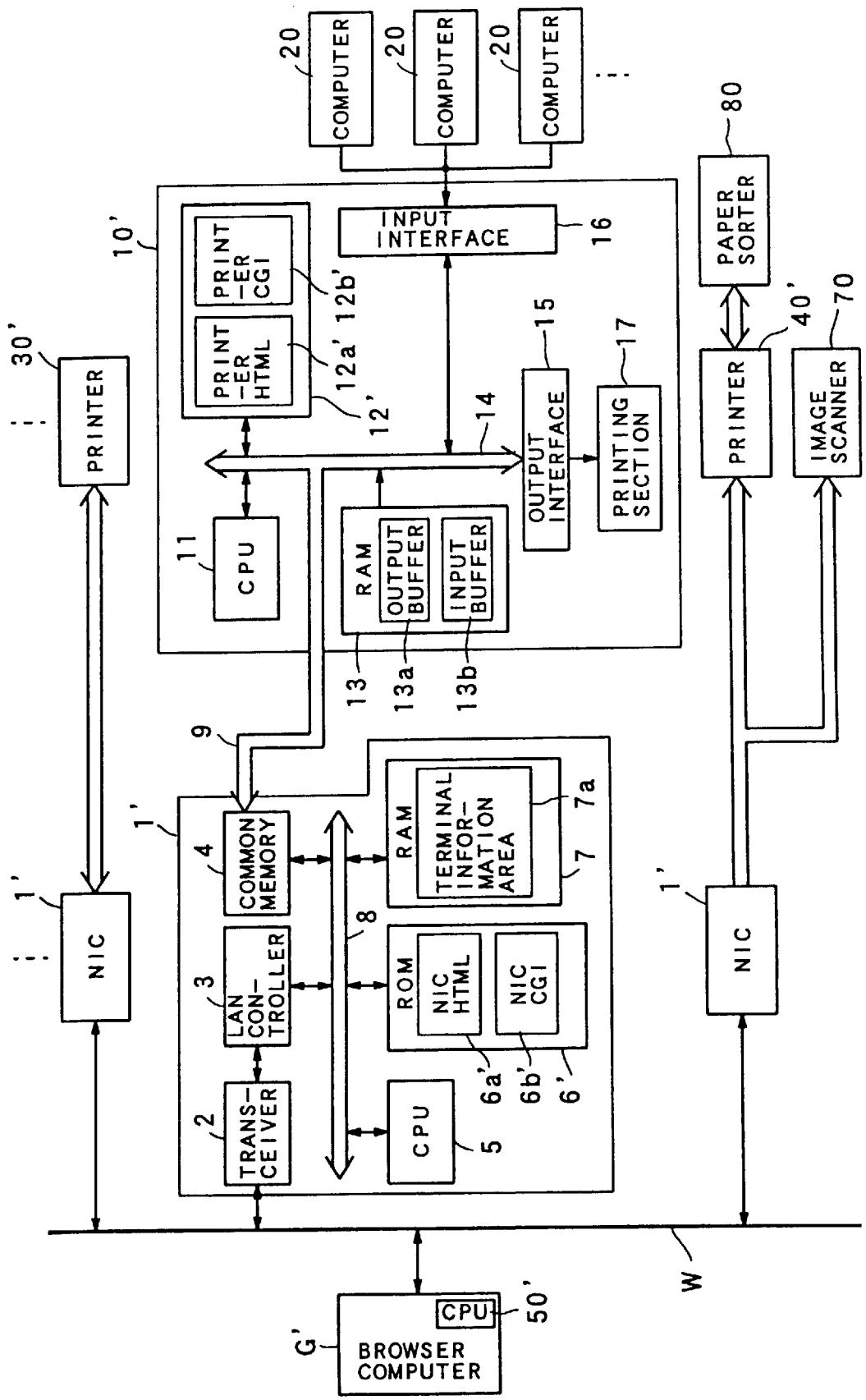
FIG. 6 is a block diagram showing a schematic configuration of a network system in a second embodiment.

Next, a configuration of a network system S' of the second embodiment is explained with reference to FIG. 6. In FIG. 6, the same constitutional elements as those in FIG. 1 carry the same reference numerals, and the explanations thereof are omitted.

As shown in FIG. 6, the network system S' in the second embodiment is provided with: a browser computer G' servicing as a managing device; a network W such as a telephone line, an LAN and the like; a plurality of NICs 1' servicing as interface devices; printers 10', 30' and 40' servicing as terminal devices; and a plurality of computers 20 connected to the printer 10'. The printers 10', 30' and 40' are different in kind from each other.

On one hand, the browser computer G' includes a CPU 50' servicing as an information transmitter.

The NIC 1' is provided with: a transceiver 2 servicing as a returning device; an LAN controller 3; a common memory 4; a CPU 5 servicing as a judging device, a first information processor and a transferring device; an ROM 6'; an RAM 7; and a bus 8. An NIC HTML 6a' and an NIC CGI 6b' are stored in advance in the ROM 6'.

Moreover, the printer 10' is provided with: a CPU 11 servicing as a second information processor; an ROM 12'; an RAM 13; a bus 14; an output interface 15; an input interface 16; and a printing section 17. At this time, a printer HTML 12a' and a printer CGI 12b' are stored in advance in the ROM 12'.

Incidentally, the printer 10' is connected to the NIC 1' through a connection line 9 connected to the bus 14, and also connected to the respective computers 20 through the input interface 16.

A schematic operation in the network system S' is explained below with reference to FIG.6. The processes in the NIC 1' and the printer 10' are explained in the following explanations. However, the similar processes are performed between the other NICs 1' and the printer 30'.

The CPU 50' in the browser computer G' generates request information (hereafter, simply referred to as a "request") to request of the printer 10' the information necessary to grasp in the browser computer G' the state of the printer 10' connected to the NIC 1' and then transmits to the transceiver 2 of the NIC 1' through the network W.

Now, the requests are actually exemplified. For example, the followings are transmitted as the requests.

① "GET /nic/*****. html HTTP/1.0"
② "GET /nic-CGI/*****. exe HTTP/1.0"
③ "GET /printer/*****. html HTTP/1.0"
④ "GET /printer-CGI/*****. exe HTTP/1.0"

In these examples, "GET" indicates it is the request. "nic", "nic-CGI", "printer" and "printer-CGI" are URLs. "***. html" or "*. exe" is information indicative of a target of a management. Such a target is typically referred to as a "resource". Names indicative of various resources are described in the parts of "***". "HTTP/1.0" is version information of HTTP. At this time, any one of the URL ("nic" or "nic-CGI") indicative of the NIC 1' and the URL ("printer" or "printer-CGI") indicative of the printer 10' is added to the request.

The transceiver 2, which has received the request, demodulates it and then outputs it to the bus 8 through the LAN controller 3.

Next, if the request received by the NIC 1' is the request including the URL specifying the NIC 1' (for example, if the request includes the URL of "nic" or "nic-CGI" as in the example shown in the ① or the ②), the CPU 5' processes the request by using the NIC CGI 6b' and the NIC HTML 6a' stored in the ROM 6' in response to the request. At this time, as for the request that can be processed only by the NIC HTML 6a' (the example shown in the ①), it is processed only by the NIC HTML 6a'. As for the request that can be processed only by the NIC CGI 6b' (the example shown in the ②), it is processed only by the NIC CGI 6b'.

After that, the CPU 5 returns the processed result (hereafter, the processes result to be returned to the browser computer G' is referred to as a "response") to the browser computer G' through the bus 8, the LAN controller 3, the transceiver 2 and the network W.

On the other hand, if the request received by the NIC 1' is a request including the URL specifying the printer 10' (for example, if the request includes the URL of "printer" or "printer-CGI" as in the example shown in the ③ or the ④), the CPU 5 transfers the request to the printer 10' through the common memory 4 and the connection line 9. At this time, after the request is written to the common memory 4, the CPU 5 causes the CPU 11 to generate an interrupt (an interrupt command) through a signal line (not shown) and then execute the process of the request.

Incidentally, a control program necessary for the process in the CPU 5 to the request is stored in advance in the ROM 6'.

Next, when the request which is transferred by the NIC 1' and specifies the printer 10' is inputted to the printer 10' through the connection line 9, the CPU 11 obtains the request through the bus 14, and then processes the request by using the printer CGI 12b' and the printer HTML 12a' stored in the ROM 12'. At this time, as for the request that can be processed only by the printer HTML 12a', it is processed only by the printer HTML 12a'. As for the request that can be processed only by the printer CGI 12b', it is processed only by the printer CGI 12b'. After that, the CPU 11 returns the response, which is the processed result, to the browser computer G' through the bus 14, the connection line 9, the common memory 4, the NIC 1' and the network W. A control program necessary for the process in the CPU 11 to the request is stored in advance in the ROM 12'.

Moreover, the NIC 1', which has received from the printer 10' the response corresponding to the request to be processed by the printer 10', transfers the response to the browser computer G' through the network W while maintaining the response in the current state.

In the browser computer G' receiving the response from the NIC 1' or the printer 10', each image or character information corresponding to the received response is displayed on a monitor (not shown) to grasp the operational state of the NIC 1' or the printer 10' and the like.

Incidentally, the respective printers 10', 30' and 40' contained in the network system S' have the common NICs 1'. However, the printers 10', 30' and 40' are different from each other in the kind of the printer itself. Actually, the printer HTML or the printer CGI stored in each printer is different for each printer.

Operations of the respective constitutional elements other than the above explained elements (e.g., operations of the LAN controller 3, the printing section 17 and the like) are similar to those of the first embodiment. Thus, the explanations of the details are omitted.

Figure 7:
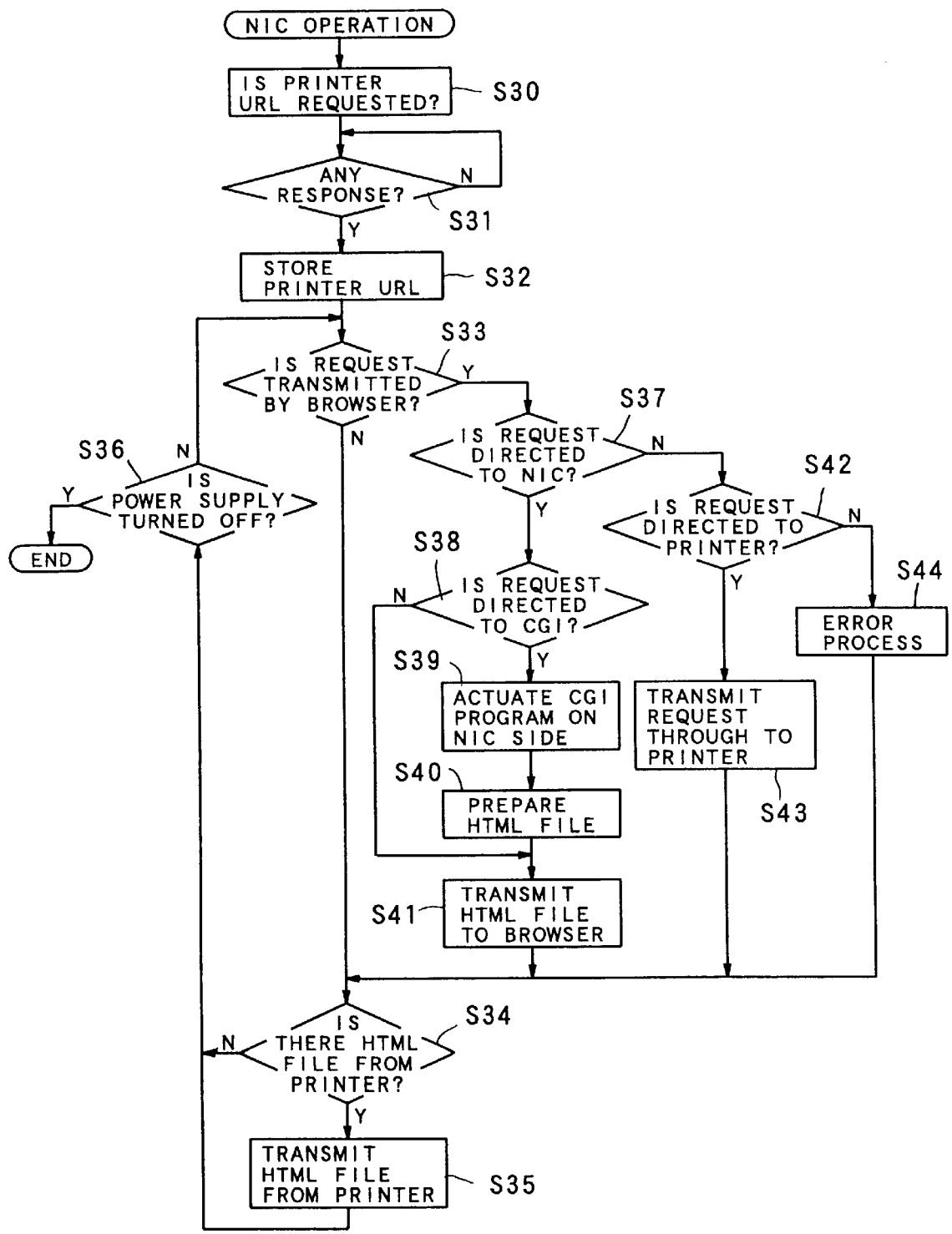
FIG. 7 a flowchart showing operations of an NIC in the second embodiment.
Figure 8:
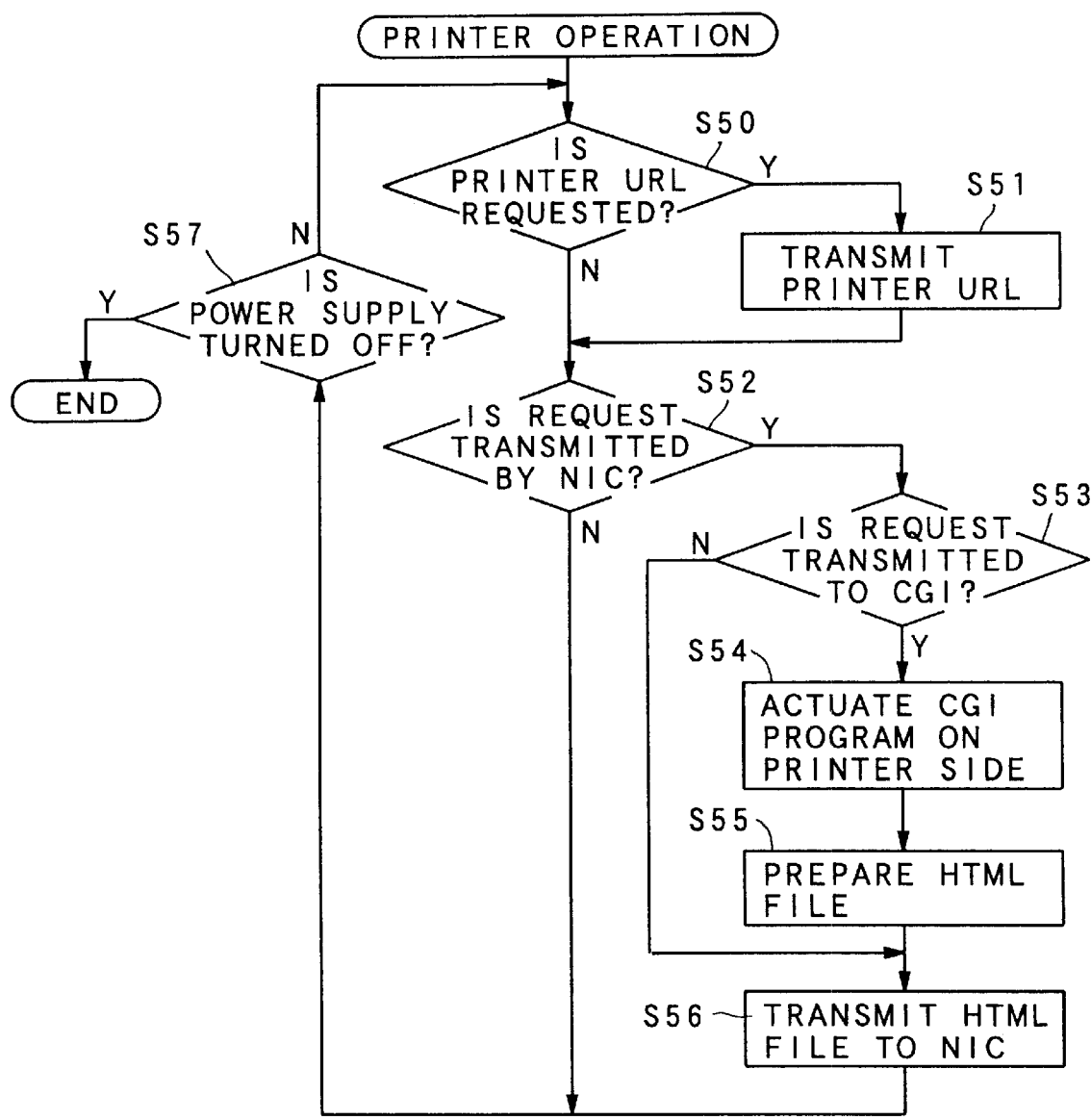
FIG. 8 is a flowchart showing operations of a printer in the second embodiment.
Figure 9:
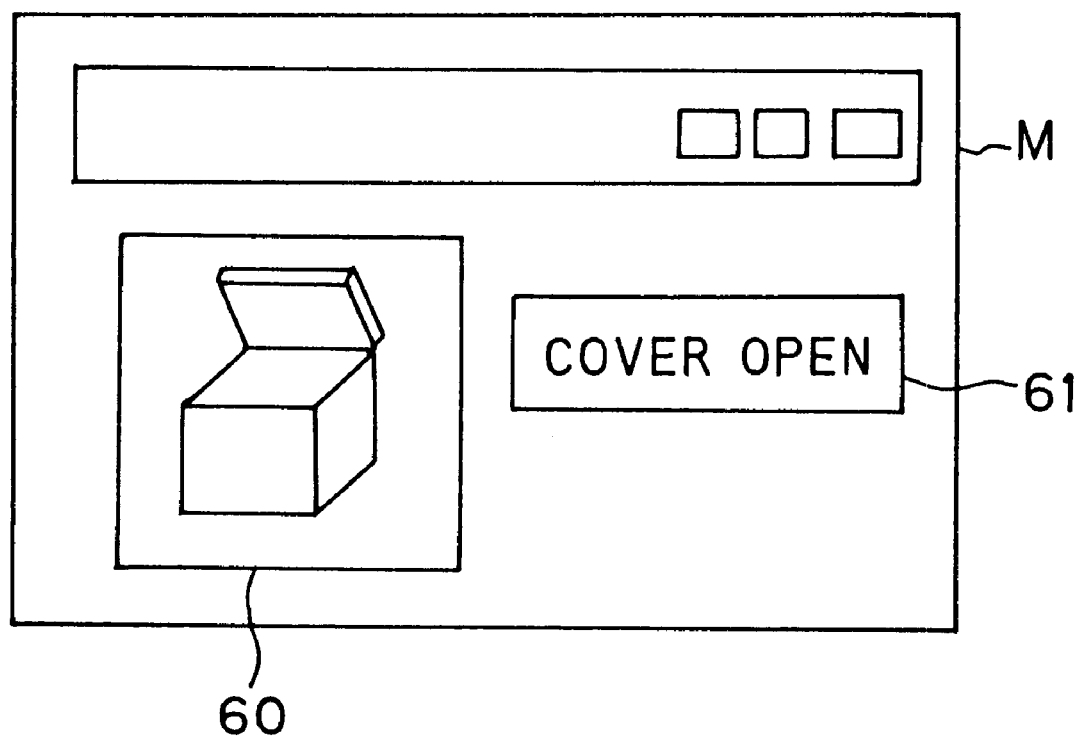
FIG. 9 is a diagram showing a display example on a browser computer in the second embodiment.

Next, the processes of the request using the URL according to the second embodiment are actually explained with reference to FIGS. 7 to 9 as for the process between the NIC 1' and the printer 10' as a target. Incidentally, a program corresponding to a flowchart shown in FIG.7 is stored in advance in the ROM 6' and is read out to the CPU 5 to be executed as the occasion demands. Moreover, a program corresponding to a flowchart shown in FIG. 8 is stored in advance in the ROM 12' and is read out to the CPU 11 to be executed as the occasion demands.

At first, the process in the NIC 1' is explained with reference to the flowchart shown in FIG.7.

As shown in FIG. 7, in the NIC 1', at first, a request signal of requesting to transmit to the NIC 1 the URL (recognized in advance by the printer 10') corresponding to the printer 10' is transmitted to the printer 10' through the connection line 9 (Step S30).

Then, it is judged whether or not the URL corresponding to the printer 10' is transmitted by the printer 10' in response to the request (Step S31). If the URL is not transmitted (Step S31; NO), the operational flow waits until the URL is transmitted. If the URL is transmitted (Step S31; YES), the transmitted URL (actually "printer" or "printer-CGI") is stored into the terminal information area 7a in the RAM 7 (Step S32).

Then, it is judged whether or not a request to which the URL is added is transmitted by the browser computer G' (Step S33). If the request is not transmitted (Step S33; NO), it is judged whether or not a response is transmitted by the printer 10' (Step S34). Namely, it is judged whether or not the HTML file transmitted by the printer 10' exists. At this time point, any response is not transmitted by the printer 10' (Step S34; NO). Thus, it is judged whether or not a power supply of the NIC 1' is turned off (Step S36). If it is judged that the power supply is turned off (Step S36; YES), the process is ended while maintaining its current state. If it is judged that the power supply is not turned off (Step S36; NO), the operational flow returns to the step S33, and waits for a reception of a next request.

On the other hand, if it is judged by the judgment at the step S33 that the request is transmitted by the browser computer G' (Step S33; YES), the URL added to the request is compared with the URL stored in the terminal information area 7a in the RAM 7 at the step S32, so that it is judged by the CPU 5 whether or not the request is directed to the NIC 1' i.e., whether or not the request specifies the NIC 1' (Step S37).

If the request specifies the NIC 1' (Step S37; YES), it is judged whether or not the request specifies the NIC CGI 16b' (Step S38). If the request does not specify the NIC CGI 16b' (Step S38; NO), the operational flow proceeds to a step S41. On the other hand, if the request specifies the NIC CGI 16b' (Step S38; YES), the NIC CGI 16b' is actuated (Step S39) to prepare an HTML file corresponding to the request (Step S40), and the operational flow proceeds to the step S41. Then, at the step S41, the prepared HTML file is returned to the browser computer G' through the bus 8, the LAN controller 3 and the network W as the response (Step S41). After that, the operational flow proceeds to the step S34. However, there is no response from the printer 10' in this case (Step S34; NO). Thus, the operational flow proceeds to the step S36 while maintaining its current state. Then, the above mentioned operations are repeated.

On the other hand, if it is judged by the judgment at the step S37 that the transmitted request does not specify the NIC 1' (Step S37; NO), the URL added to the request is compared with the URL stored at the step S32, so that it is judged by the CPU 5 whether or not the request is directed to the printer 10' i.e., whether or not the request specifies the printer 10' (Step S42). If the request specifies the printer 10' (Step S42; YES), the request is transmitted to the printer 10' through the common memory 4 and the connection line 9 while maintaining its current state (Step S43). Then, the operational flow proceeds to the step S34. The operation at the step S36 is executed.

Moreover, if it is judged by the judgment at the step S42 that the request does not specify the printer 10' (Step S42; NO), a predetermined error process when the received request cannot be processed is executed (Step S44). Then, the operational flow proceeds to the step S34.

Incidentally, if the response corresponding to the request is to be transmitted by the printer 10' in response to the process at the step S43 (Step S34 ; YES), the response is transferred to the browser computer G' through the network W (Step S35). Then, the operational flow proceeds to the step S36.

Next, the operation of the printer 10' corresponding to that of the NIC 1' shown in FIG. 7 is explained with reference to FIG. 8.

In the printer 10', at first, it is judged whether or not the request signal of transmitting the URL of the printer 10' is transmitted by the NIC 1 in correspondence with the step S30 in FIG. 7 (Step S50). If the request signal is transmitted (Step S50; YES), the URL (actually "printer" or "printer-CGI") is transmitted to the NIC 1' (Step S51). Then, the operational flow proceeds to a step S52.

If it is judged by the judgment at the step S50 that the request signal is not transmitted by the NIC 1' (Step S50; NO), it is judged whether or not the request specifying the printer 10' through the NIC 1' is transmitted by the browser computer G', in correspondence with the step S42 in FIG. 6 (Step S52). If the request is not transmitted (Step S52; NO), it is judged whether or not the power supply of the printer 10' is turned off (Step S57). If it is judged that the power supply is turned off (Step S57; YES), the process at the printer 10' is ended while maintaining its current state. If it is not judged that the power supply is not turned off (Step S57 ; NO), the operational flow returns to the step S50, and waits for a reception of a next request signal.

On the other hand, if it is judged by the judgment at the step S52 that the request specifying the printer 10' is transmitted (Step S52; YES), it is judged whether or not the request is directed to the printer CGI 12b' i.e., whether or not the request specifies the printer CGI 12b' (Step S53). If the request does not specify the printer CGI 12*b'* (Step S53; NO), the operational flow directly proceeds to a step S56 while maintaining its current state. On the other hand, if the request specifies the printer CGI 12*b'* (Step S53; YES), the printer CGI 12*b'* is actuated (Step S54) to prepare an HTML file corresponding to the request (Step S55), and the operational flow proceeds to the step S56. Then, at the step S56, the prepared HTML file is transmitted to the browser computer G' through the bus 14, the NIC 1' and the network W as the response, in correspondence with the steps S34, S35 in FIG. 7 (Step S56). After that, the operational flow proceeds to the step S57. Then, the above mentioned processes are executed.

In the browser computer G', which has received the response from the NIC 1' or the printer 10', the image or character information corresponding to the received response is displayed on a monitor to grasp the operational state of the printer 10' and the like. More actually, for example, the printer 10' whose cover is open is schematically displayed on an image display region 60 of a monitor M, based on the response from the printer 10' in a condition that its cover is open and thereby a typing process cannot be done, as shown in FIG.9. Moreover, a warning message of "COVER OPEN" is displayed on a character display region 61 of the display M.

Incidentally, the above mentioned processes between the NIC 1' and the printer 10' are also similarly executed between the NIC 1' and the printer 30'. That is, the NIC HTML 6*a'* and the NIC CGI 6*b'* corresponding to the request specifying the NIC 1' are stored in the ROM 6' of the NIC 1', for example, as for the processes between the NIC 1' and the printer 30'. On the other hand, the printer HTML 12*a'* and the printer CGI 12*b'* corresponding to the request (the request including the URL peculiar to the printer 30') specifying the printer 30' are stored in the ROM 12' of the printer 30'. Accordingly, the request specifying the NIC 1' is processed by the NIC 1'. Then, a response is returned. On the other hand, the request specifying the printer 30' is passed through the NIC 1', is transmitted to the printer 30' and is processed by the printer 30'. Then, the response is returned.

As mentioned above, the printer 10' is connected to the NIC 1' in a one-to-one relation. In addition, as shown in FIG. 6, the printer 40' is connected to the NIC 1', and further, for example, the image scanner 70 may be connected to the NIC 1' in parallel to the printer 40'.

In this case, in the steps S30 to S32 of the explanations about the processes in the NIC 1', the NIC 1' sequentially outputs the request signals to the printer 40' and the image scanner 70, obtains the responses of the respective URLs, and further brings the obtained URLs into proper correlation and stores in the terminal information area 7*a* in the RAM 7. If the request is transmitted by the browser computer G' (Step S33), the judgment is performed in accordance with the URLs which have the proper correlation and are stored in this terminal information area 7*a*, and then the request is transmitted to one of the printer 40' and the image scanner 70. After that, the above mentioned processes respectively corresponding to the printer 40' and the image scanner 70 are executed in the printer 40 and the image scanner.

On the other hand, the intelligent paper sorter 80 may be connected to the printer 40', as shown in FIG. 6.

In this case, the printer 40' performs the process similar to that of the NIC 1'. That is, at first,. the URL of the paper sorter 80 is transmitted to the printer 40' based on the request signal from the printer 40'. Moreover, the URL of the printer 40' itself and the URL of the paper sorter 80 are transmitted to the NIC 1', and are stored into the terminal information area 7*a* in the NIC 1'.

Next, the NIC 1' judges the request from the browser computer G'. If judging from the URL that the request targets the information to be processed by the printer 40' or a device located at the lower order than the printer 40', the NIC 1' transfers the request to the printer 40'. Then, the printer 40' judges this request transferred by the NIC 1'. If judging that the request targets the information to be processed by the paper sorter 80 located at the lower order, the printer 40' transfers the request to the paper sorter 80. After that, if a response is returned by the paper sorter 80, the printer 40' transfers it to the NIC 1'. Then, the NIC 1' transfers the returned response to the browser computer G'.

As explained above, according to the processes in the network system S' of the second embodiment, the request specifying the NIC 1' is processed by the NIC 1'. On the other hand, the request specifying the printer 10' is passed through the NIC 1', is transmitted to the printer 10' and is processed by the printer 10'. Thus, the NIC 1' need not process the process with regard to the request specifying the printer 10'. Hence, it is possible to respectively connect the plurality of kinds of printers to the common NIC 1' to thereby implement the network system S'.

The request includes the URL, which corresponds to the request and also indicates a resource included in any one of the NIC 1' and the printer 10'. The CPU 5 judges, on the basis of the URL, whether the request transmitted by the browser computer G' is the request indicative of the resource included in the printer 10' or the request indicative of the resource included in the NIC 1'. Thus, it is possible to surely judge and process the attribute of the request.

Moreover, the printer 10' is managed in accordance with the HTTP, and further the URL is used to judge the attribute of the request. Hence it is possible to easily and cheaply implement a wide area network using the WWW.

Moreover, the URL from the printer 10' is used to judge whether the request transmitted by the browser computer G' is the request indicative of the resource included in the printer 10' or the request indicative of the resource included in the NIC 1'. Thus, it is possible to surely classify the request. Furthermore, the browser computer G' can easily manage the operational condition which corresponds to the resource of the printer 10' itself and is peculiar to the printer 10'.

In the respective embodiments, the case is explained in which the printer is used as the terminal device of the network system. In addition, for example, the present invention may be applied to a network system having a hub (a line concentration switch located somewhere in a network system), a scanner, a facsimile, a telephone or other computers, as a terminal device.

Moreover, in the respective embodiments, the case is explained in which the program corresponding to the flowchart shown in FIG. 3, 4, 7 or 8 is stored in advance in each ROM. In addition, a case described below may be considered. That is, a program corresponding to a process with regard to the NIC is stored in a flexible disk or the like as a record medium. For example, a so-called interface card is mounted in a personal computer (hereafter, referred to as PC) or the like. Then, the stored program is read out so as to control the interface card by the PC. A CPU in the PC is controlled in accordance with the program to thereby drive the interface card. Moreover, the terminal devices, such as the printer, the image scanner and the like, may be connected to a local port (for example, a local port 1 corresponding to a two-way centronics) of the PC, and then the control is performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-213724 filed on Aug. 7, 1997 including the specification, claims, drawings and summary is incorporated herein by reference in its entirety.

What is claimed is:

1. A method for managing status request information transmitted from a managing device to an interface device through a network, the interface device being installed in a terminal device, the method comprising the steps of:

requesting, by the interface device to the terminal device, a lead information of the terminal device;

transmitting, by the terminal device, the lead information to the interface device;

storing the lead information in a memory of the interface device;

transmitting, by the managing device, the status request information to the interface device;

receiving, by the interface device, the status request information including a node information transmitted from the managing device;

comparing the node information with the lead information stored in the memory so as to judge whether the status request information is to be processed in the interface device or in the terminal device;

processing the status request information at the interface device if the status request information is judged to be processed in the interface device;

transmitting a first processing information, which is a process result by the processing step at the interface device, to the managing device through the network;

transferring the status request information to the terminal device if the status request information is judged to be processed in the terminal device;

processing the status request information at the terminal device if the status request information is judged to be processed in the terminal device; and transmitting a second processing information, which is a process result by the processing step at the terminal device, to the managing device through the interface device and the network.

2. The method according to claim 1, wherein the lead information and the node information indicate a hierarchy structure.

3. The method according to claim 1, wherein the managing device manages the terminal device on the basis of SNMP (Simple Network Management Protocol); and the lead information and the node information comprise route information in MIB (Management Information Base) information corresponding to SNMP (Simple Network Management Protocol).

* * * * *